W. A. STINSON.
SWINGLETREE AND TRACE CONNECTION.
APPLICATION FILED APR. 14, 1910.
1,017,024.
Patented Feb. 13, 1912.
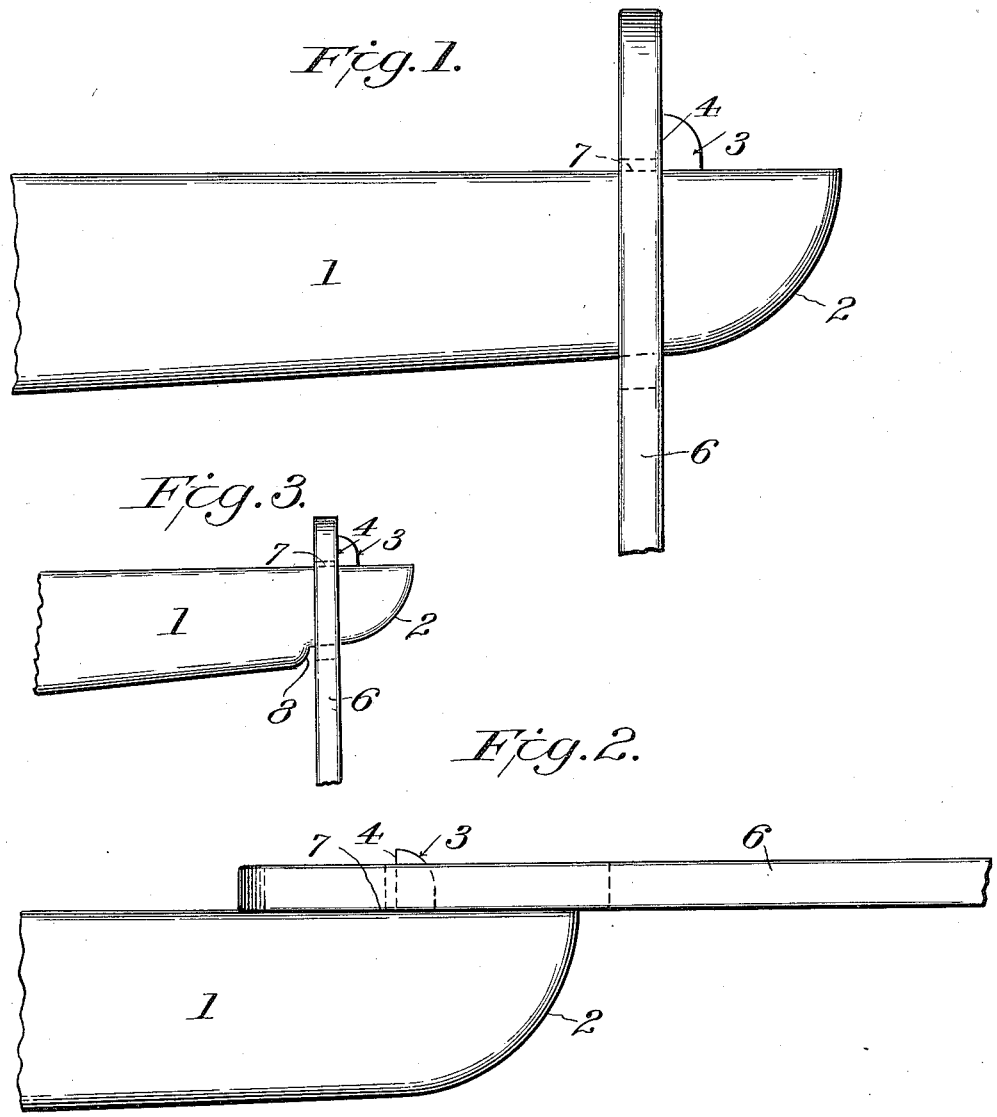
Witnesses
C. W. Walker.
C. E. Sample.
Inventor
William A. Stinson.
By
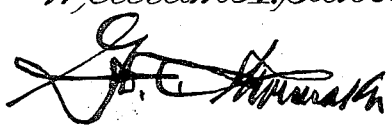
Attorney

//UNITED STATES PATENT OFFICE.

WILLIAM ARTHUR STINSON, OF GREENWOOD, MISSISSIPPI.

SWINGLETREE AND TRACE CONNECTION.

1,017,024.  Specification of Letters Patent.  Patented Feb. 13, 1912.

Application filed April 14, 1910. Serial No. 555,336.

*To all whom it may concern:*

Be it known that I, WILLIAM A. STINSON, a citizen of the United States, residing at Greenwood, in the county of Leflore and State of Mississippi, have invented certain new and useful Improvements in Swingletree and Trace Connections, of which the following is a specification.

This invention relates to a swingletree and trace connection.

The object of the invention is to provide a swingletree embodying a trace holder and having such peculiar formation at its end adjacent the holder as to permit of an easy application of the trace to the swingletree, so that, while the trace may be easily applied to the swingletree, it will be held thereon against accidental disconnection therefrom and against undue inner movement along the swingletree.

With the above and other objects in view, the present invention consists in the combination and arrangement of parts illustrated in the accompanying drawings, described in the specification and particularly pointed out in the appended claims.

In the drawings:—Figure 1 is a plan view of a portion of a swingletree showing the device in operative position. Fig. 2 is a similar view showing the first step toward applying the trace to the swingletree. Fig. 3 is a view similar to Fig. 1 illustrating a modified form of the invention.

Referring now to the accompanying drawings, and more particularly to Figs. 1 and 2, the character 1 indicates a portion of a swingletree having its end reduced along its front edge by forming the outer end of the tree on a curve, as at 2, thereby leaving the tree its full length at its rear edge with its front edge shortened, whereby the strength at the rear edge of the tree is not weakened incident to the formation of the curved end 2 but maintains its normal strength.

It will be understood that each end of the tree is formed the same with the curvature thereof gradually merging from the front to the rear face of the tree. Secured to each end of the tree at the rear of the latter is a stop 3, each stop being provided with a face on its inner side to form a shoulder 4. The stops 3 are so disposed with relation to the ends of the tree that the distance between each stop at the base of the inner side thereof and the adjacent extremity of the tree at the rear of the latter is substantially the same as the distance between the same point on the stop and any point along the line of the curvature 2 and also between the same point on the stop and the front face of the tree where the rounded or curved portion 2 merges into the front face of the tree. Thus, the ends of the tree are formed each upon substantially an arc with the center of the arc at the base of the inner side of the corresponding stop.

The character 6 indicates a common type of trace having the universal eye 7 which may be engaged at one end with the shoulder 4 of one of the stops with the opposite end of the eye brought adjacent to the extremity of the tree at the rear of the latter, as may be seen in Fig. 2. Said opposite end of the eye is then pulled or forced over the curvature 2 until it reaches a point where the curvature merges into the front face of the tree when the trace will have its outer face disposed against the inner face of the corresponding stop, where it will be held against accidental disconnection from the tree, and yet, by a reverse manipulation of the trace permit of ready detachment thereof from the tree.

By virtue of my peculiar formation of tree and arrangement of stop, the traces in common use, that is, those provided with the universal securing eye may be readily secured to or detached from the tree, such universal eyes having snug engagement with the tree during its swinging movement over the curved end 2 and when positioned as shown in Fig. 1.

In Fig. 3 the swingletree is the same as that shown in Figs. 1 and 2 save that in Fig. 3 the trace is provided with a shoulder 8 which may be employed, if desired, to obviate any possibility of the trace slipping toward the center of the tree.

What is claimed is:

1. The combination with a swingletree having an end reduced along its front edge only to form a shoulder, of a stop secured to the tree at the rear of the latter, the stop and shoulder being arranged diagonally opposite each other and only slightly out of alinement with each other, and a trace having an eye adapted to be passed over said stop and be swung on the latter over the end of the tree into engagement with said shoulder, the stop preventing accidental outward movement of the trace from off the tree and the shoulder at the front of the tree limiting inward movement of the trace on the tree, the trace having only slight play between said stop and shoulder.

2. The combination with a swingletree whose rear edge is longer than its front edge and having a rounded end with the curvature thereof merging from the rear edge of the tree into the front thereof, of a stop secured to the rear of the tree near the end thereof, the distance between the inner side of the stop at the base of the latter and the end of the tree at the rear of the latter being substantially the same as the distance between the inner side of the stop at the base of the latter and all points of the adjacent curvature or rounded end of the tree and also between the same point of the stop and the front face of the tree where the curvature merges into the front edge of the tree, and a trace having an eye adapted to be placed over said stop and swung on the latter over the curved end of the tree to pass the end of the tree through the eye and position the ends of the eye adjacent the front and rear edges of the tree.

In testimony whereof I affix my signature in presence of two witnesses.

WILLIAM ARTHUR STINSON.

Witnesses:
R. C. HUSTON,
IRA BIDDLE.

Copies of this patent may be obtained for five cents each, by addressing the "Commissioner of Patents, Washington, D. C."